United States Patent
Hibino (10) Patent No.: US 7,958,551 B2
(45) Date of Patent: Jun. 7, 2011

(54) INFORMATION PROCESSING APPARATUS AND A COMPUTER USABLE MEDIUM THEREFOR

(75) Inventor: Masaaki Hibino, Yokkaichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 844 days.

(21) Appl. No.: 11/860,375

(22) Filed: Sep. 24, 2007

(65) Prior Publication Data

US 2008/0077700 A1 Mar. 27, 2008

(30) Foreign Application Priority Data

Sep. 27, 2006 (JP) ................................ 2006-263565

(51) Int. Cl.
*G06F 15/16* (2006.01)
(52) U.S. Cl. ............................... 726/14; 726/5; 709/230
(58) Field of Classification Search .................. 709/230; 726/5, 14
See application file for complete search history.

(56) References Cited

U.S. PATENT DOCUMENTS

| 2005/0219640 A1 | 10/2005 | Kasatani |
| 2007/0094716 A1* | 4/2007 | Farino et al. ...................... 726/5 |

FOREIGN PATENT DOCUMENTS

| JP | 2000-035930 A | 2/2000 |
| JP | 2004-364218 A | 12/2004 |
| JP | 2005-242520 A | 9/2005 |

* cited by examiner

*Primary Examiner* — Thanhnga B Truong
*Assistant Examiner* — Angela Holmes
(74) *Attorney, Agent, or Firm* — Baker Botts L.L.P.

(57) ABSTRACT

An information processing apparatus, including a storage device a security list, wherein a security level of each of communication protocols installed in a network is listed, a status management list, which describes validity of each communication protocol, and a protocol setting system, which sets validity of each communication protocol, is provided. The protocol setting system includes a status detecting unit, which refers to the status management list and detects validity of each communication protocol, an unsecured protocol detecting unit, which refers to the security list when at least one of the communication protocols is validated and detects a communication protocol with a security level being lower than the validated communication protocol, and a status updating unit, which invalidates the communication protocol detected by the unsecured protocol detecting unit to have the lower security level and detected to be valid by the status detecting unit.

9 Claims, 11 Drawing Sheets

| Protocols | Security | Group | | |
|---|---|---|---|---|
| | | Management | Print | Scan |
| https | 1 | 1 | 1 | 1 |
| http | | 1 | 1 | 1 |
| snmp v1 | | 1 | | |
| snmp v3 | 1 | 1 | | |
| ipps | 1 | | 1 | |
| ipp | | | 1 | |
| lpr | | | 1 | |
| p9100 | | 1 | 1 | |
| ftp | | | 1 | 1 |
| p51002s | 1 | | | 1 |
| p51001 | | | | 1 |

FIG. 4

| Protocols | Security | Group | | | Enabled | #Security | #Group | | |
|---|---|---|---|---|---|---|---|---|---|
| | | Management | Print | Scan | | | #Management | #Print | #Scan |
| https | 1 | 1 | 1 | 1 | 1 | | | | |
| http | | 1 | 1 | 1 | 1 | 1 | 1 | 1 | 1 |
| snmp v1 | | 1 | | | 1 | 1 | 1 | | |
| snmp v3 | 1 | 1 | | | 1 | | | | |
| ipps | 1 | | 1 | | 1 | | | | |
| ipp | | | 1 | | 1 | 1 | 1 | 1 | |
| lpr | | 1 | 1 | | 1 | 1 | | 1 | |
| p9100 | | | 1 | | 1 | 1 | 1 | 1 | |
| ftp | | | | 1 | 1 | 1 | | | 1 |
| p51002s | 1 | | | 1 | 1 | 1 | | | |
| p51001 | | | | 1 | 1 | | | | 1 |

FIG. 5

| Protocols | Enabled |
|---|---|
| https | 1 |
| http | 1 |
| snmp v1 | 1 |
| snmp v3 | 1 |
| ipps | 1 |
| ipp | 1 |
| lpr | 1 |
| p9100 | 1 |
| ftp | 1 |
| p51002s | 1 |
| p51001 | 1 |

Attention !

ipps, a secure communication protocol for printing, has been validated. However, currently the following unsecured communication protocols for printing are also validated, which can make security holes in the communication. It is recommended to invalidate the unsecured communication protocols.

- ☑ http
- ☑ ipp
- ☑ lpr
- ☑ p9100
- ☑ ftp

[ OK ]  [ Cancel ]

FIG.11

INFORMATION PROCESSING APPARATUS AND A COMPUTER USABLE MEDIUM THEREFOR

CROSS REFERENCE TO RELATED APPLICATION

This application claims priority from Japanese Patent Application NO. 2006-263565, filed on Sep. 27, 2006, the entire subject matter of which is incorporated herein by reference.

BACKGROUND

1. Technical Field

An aspect of the present invention relates to an information processing apparatus, which is capable of securely communicating with another computer terminal via a network, and a program to be executed in the information processing apparatus.

2. Related Art

Conventionally, an MFP (multi-function peripheral) capable of exchanging various data with another computer terminal via a network by using a plurality of communication protocols is known. Such an MFP is disclosed in Japanese Patent Provisional Publication 2005-242520, for example, and the communication protocols include SSL (Secure Sockets Layer) and IPSec (Internet Protocol Security), which require user authentication and data encryption for communication security.

In the communication system in the above referenced publication, however, there may be a case wherein both of a secure communication protocol and a communication protocol with uncertain security (so-called legacy protocol) coexist. In such a communication environment, even if a user installs an electronic certificate and enables SSL for secure communication in his/her information processing apparatus, communication can be undesirably achieved using the legacy protocol when the legacy protocol is validated. In other words, the legacy protocol makes a security hole, which causes difficulty in achieving secure communication through the network.

SUMMARY

In view of the above, the present invention is advantageous in that an information processing apparatus capable of securely communicating in a network, wherein a secure communication protocol and an unsecured communication protocol coexist, and a program therefore, is provided.

According to an aspect of the invention, an information processing apparatus, which is capable of communicating in a plurality of communication protocols with another device being installed in a network, is provided. The information processing apparatus is provided with a storage device, a security list, in which a security level of each of the communication protocols is listed, stored in the storage device, a status management list, in which at least one of validity and invalidity of each of the communication protocols is described, being stored in the storage device, and a protocol setting system, which sets at least one of validity and invalidity of each of the communication protocols. At least one of validity and invalidity of each of the communication protocols can be arbitrarily set by a user. The protocol setting system includes a status detecting unit, which refers to the status management list and detects at least one of validity and invalidity of each of the communication protocols, an unsecured protocol detecting unit, which refers to the security list when at least one of the communication protocols is validated and detects a communication protocol with a security level being lower than the validated communication protocol, and a status updating unit, which invalidates the communication protocol detected by the unsecured protocol detecting unit to have the lower security level and detected to be valid by the status detecting unit.

According to another aspect of the invention, the present invention is advantageous in that a computer usable medium having computer readable instructions for controlling a computer is provided. The computer includes a storage device to communicate with another device installed in a network in a plurality of communication protocols by executing steps of referring to a status management list, in which at least one of validity and invalidity of each of the communication protocols is described, and detecting at least one of validity and invalidity of each of the communication protocol, referring to a security list, in which a security level of each of the communication protocols is listed, when at least one of the communication protocols is validated and detecting a communication protocol with a security level being lower than the validated communication protocol, and invalidating the communication protocol detected to have the lower security level and detected to be valid.

With the above configurations, secure communication can be achieved in a network in which a secured communication protocol and an unsecured communication protocol coexist.

DETAILED DESCRIPTION

Hereinafter, embodiments according to aspects of the present invention will be described with reference to the accompanying drawings.

Figure 1:
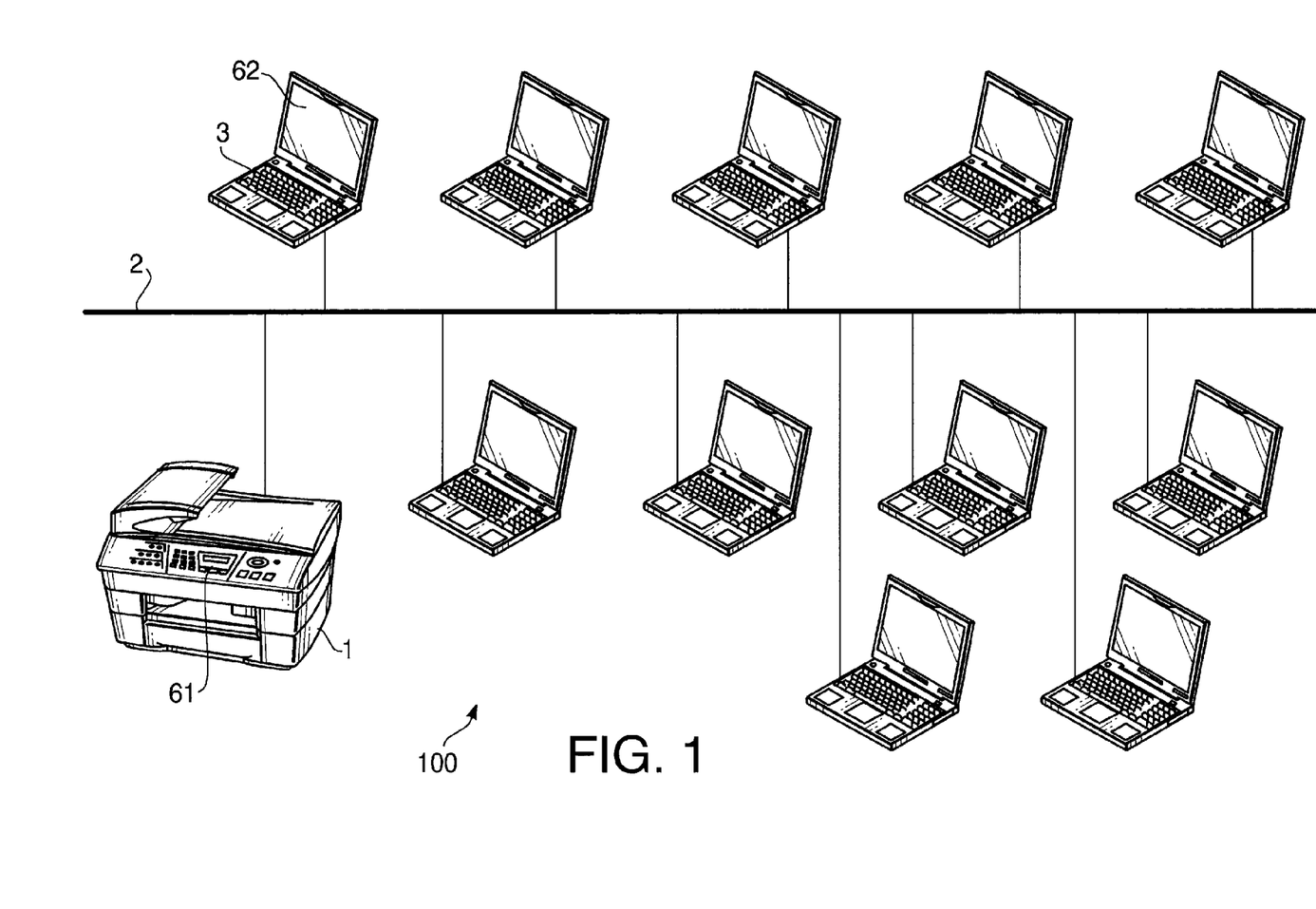
FIG. 1 is a schematic diagram to illustrate a communication network having a network MFP according to a first embodiment of the present invention.

A first embodiment according to the present invention will be described herein below. FIG. 1 is a schematic diagram to illustrate a communication network 100 having a network MFP 1 according to the first embodiment of the present invention. In the present embodiment, the network MFP 1 is equipped with multiple functions such as a copying function, a printing function, a scanning function, and a facsimile transmission function to process various information obtained through the communication network 100.

As shown in FIG. 1, the network MFP 1 is connected with a plurality of terminal devices 3 through the network 2. In the present embodiment, the network 2 can be, for example, a LAN (local area network) and a wireless LAN, and the terminal device 3 can be, for example, a PC (personal computer.)

Communication within the communication network 100 (for example, communication between the network MFP 1 and one of the terminal devices 3, and communication between two of the terminal devices 3) is performed by using various communication protocols. Such protocols include, for example, https, http, snmp v3, snmp v1, ipps, and ipp to be used in the communication network 100. It is noted that, in the communication network 100, communication protocols for secure communication and communication protocols for unsecured communication coexist.

Figure 2:
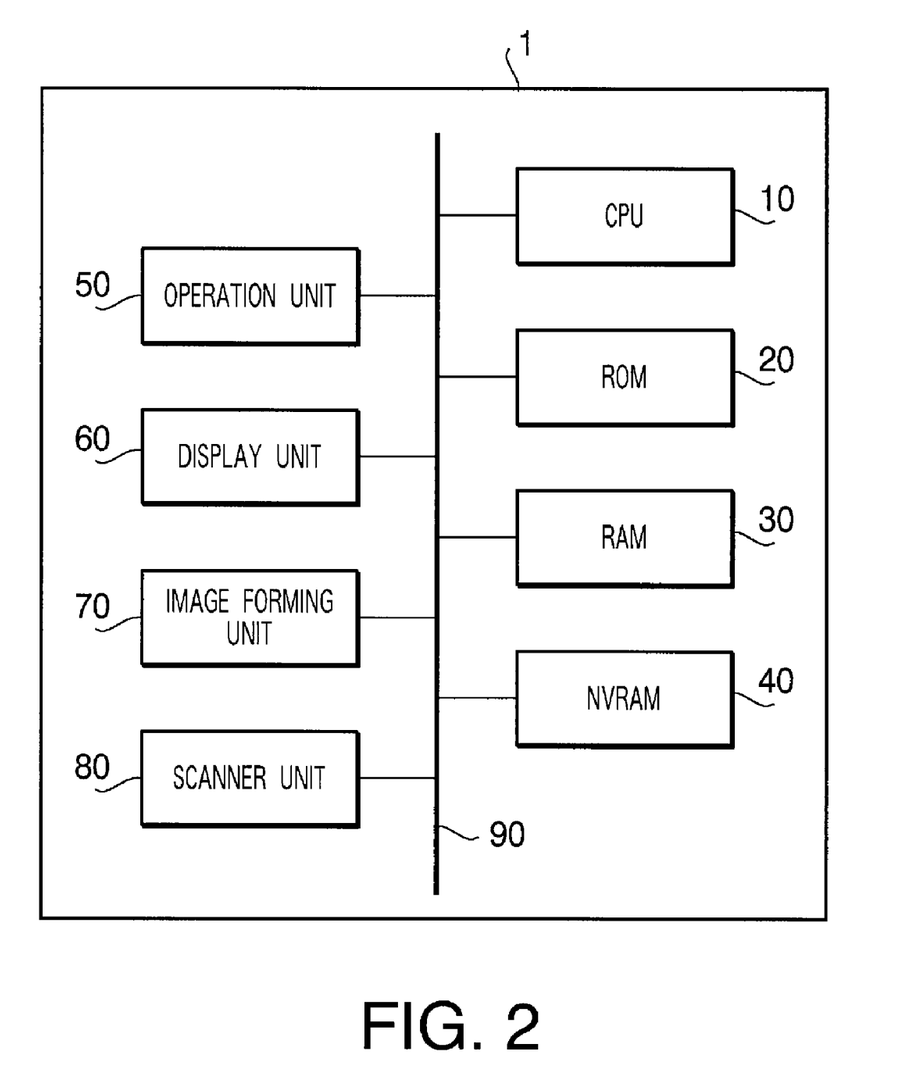
FIG. 2 is a block diagram to illustrate a configuration of the network MFP according to the first embodiment of the present invention.
Figure 3:
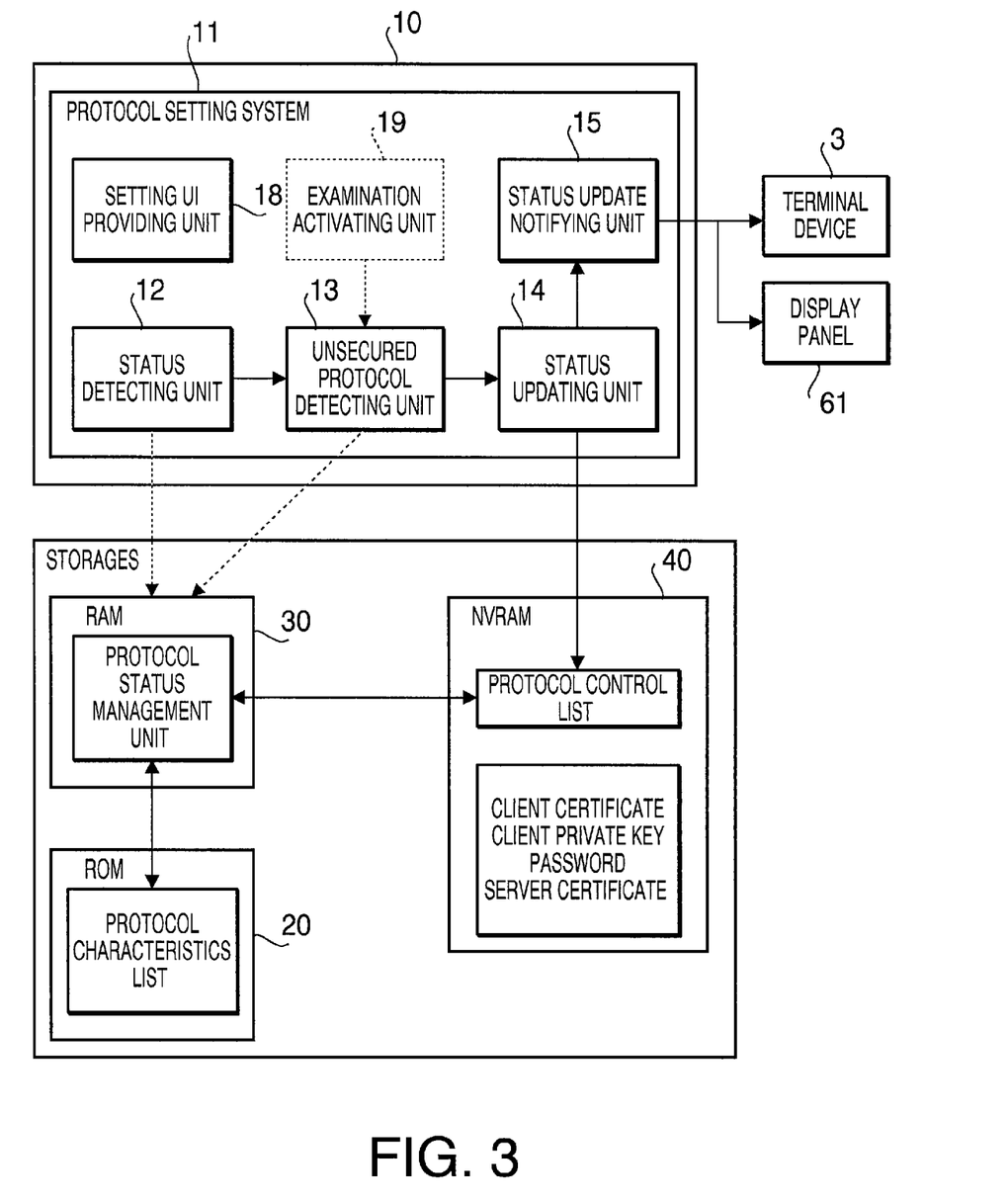
FIG. 3 is a block diagram to illustrate configurations of a CPU, a ROM, a RAM, and an NVRAM of the network MFP according to the first embodiment of the present invention.

FIG. 2 is a block diagram to illustrate a configuration of the network MFP 1 according to the first embodiment of the present invention. FIG. 3 is a block diagram to illustrate configurations of a CPU 10, a ROM 20, a RAM 30, and an NVRAM 80 of the network MFP 1 according to the first embodiment of the present invention.

As shown in FIGS. 2 and 3, the network MFP 1 is configured to have an operation unit 50, a display unit 60, and an image forming unit 70, and a scanner unit 80 in addition to the CPU 10, the ROM 20, the RAM 30, and the NVRAM 80, and the components are connected with one another through a bus 90.

The CPU 10 controls operations of the network MFP 1 according to various programs, information regarding the network MFP 1, and information required to communicate with the other devices including the terminal devices 3, which are stored in the storages (i.e., the ROM 20, the RAM 30, and the NVRAM 80.) Details of the CPU 10 will be described later.

The ROM 20 is a read-only storage medium to store various information including a protocol characteristics list, which will be described below, and various programs to be executed by the CPU 10.

Figure 4:
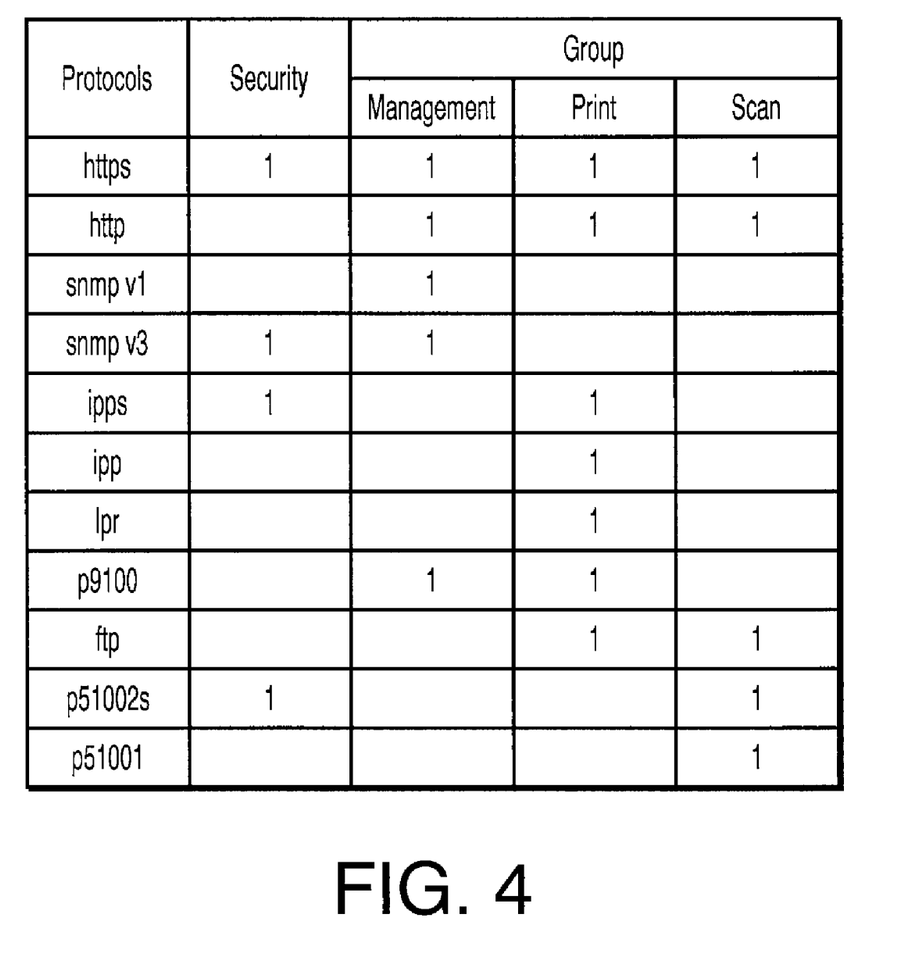
FIG. 4 is a chart to illustrate characteristics of protocols according to the first embodiment of the present invention.

FIG. 4 is a protocol characteristics list, which is a chart to illustrate characteristics of protocols, according to the first embodiment of the present invention. In the protocol characteristics list, information concerning the communication protocols used within the communication network 100 are listed. Further, a security level of each communication protocol is indicated. Furthermore, one or more functions of the network MFP 1 supported by the communication protocols are indicated on a communication protocol basis. Thus, in the present embodiment, the protocol characteristics list includes information items "Protocols", "Security", and "Group" to be indicated.

In the "Protocols" column, the communication protocols used within the communication network 100 are listed. In the protocol characteristics list shown in FIG. 4, "https", "http", "snmp v1", "snmp v3", "ipps", "ipp", "1pr", "p9100", "ftp", "51002s", and "p51001" are provided.

In the "Security" column, a security level of each communication protocol listed in the "Protocols" column is indicated. In the present embodiment, the communication protocols which are enabled substantially secure communication are indicated by "1" in the "Security" column. Thus, it can be found in the protocol characteristics list shown in FIG. 4 that the communication protocols "https", "snmp v3", "ipps", and "p51002s" are capable of secure communication.

In the "Group" column, functions of the network MFP 1 supported by the communication protocols are indicated. More specifically, the "Group" column includes subitems which indicate detailed functions of the network MFP 1. In the present embodiment, the subitems include "Management", "Print", and "Scan" as the functions of the network MFP 1, and the functions supported by the communication protocols are indicated by "1" on a communication protocol basis. Thus, if one of the communication protocols is indicated by "1" in the "Print" column, it can be found that the network MFP 1 is enabled to communicate within the communication network 100 regarding the printing function by using the protocol. If a second communication protocol is indicated by "1" in the "Management" column, the network MFP 1 is enabled to communicate regarding the management function by using the second protocol. Similarly, if a third protocol is indicated by "1" in the "Scan" column, the network MFP 1 is enabled to communicate regarding the scanning function by using the third protocol.

Thus, it can be found in the protocol characteristics list shown in FIG. 4 that the communication protocol "https" is enabled communication regarding management, printing, and scanning. The communication protocol "ipps" is enabled communication regarding printing.

The RAM 30 (FIG. 2) of the network MFP 1 is a readable and writable volatile memory medium, in which a protocol status management list is stored. Details of the protocol status management list are described below.

Figure 5:
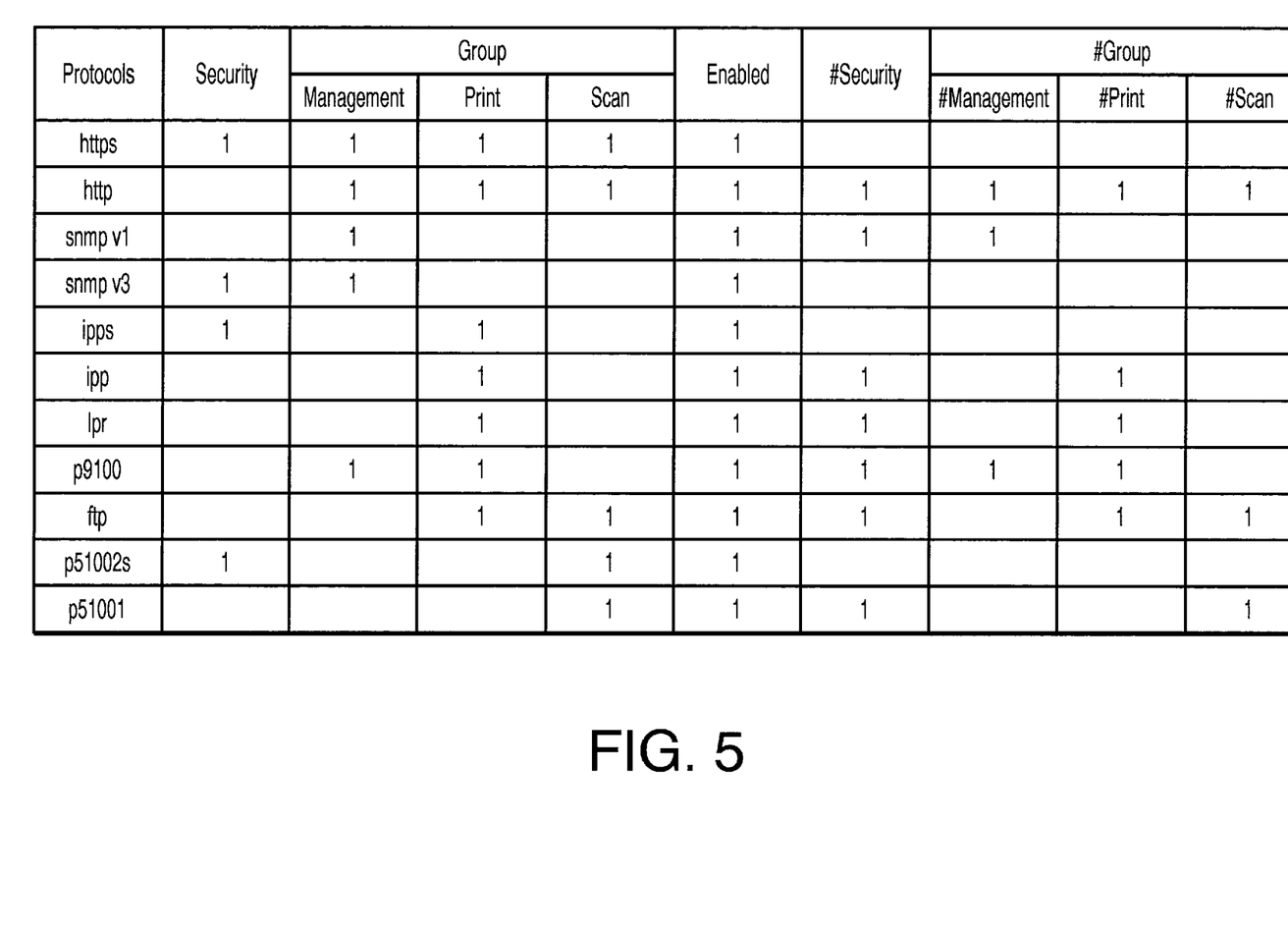
FIG. 5 is a chart to illustrate a protocol status management list according to the first embodiment of the present invention.

FIG. 5 is a chart to illustrate the protocol status management list according to the first embodiment of the present invention. The protocol status management list includes information on valid communication protocols among the communication protocols used within the communication network 100, information on security of the communication protocols, and information on a printing function supported by the communication protocols.

Thus, in the present embodiment, the protocol status management list includes information items indicated in each column. It is noted that the protocol status management list is separated by an "Enabled" column. A left-hand side of the protocol status management list includes the identical information to the protocol characteristics list (see FIG. 4), therefore, description of the identical information is omitted, and a right-hand side of the protocol status management list indicates information of the communication protocols which are not enabled substantially secure communication.

The "Enabled" column indicates validity of each of the communication protocols in the network MFP 1, i.e., a communication protocol valid in the network MFP 1 is indicated by "1" in the "Enabled" column. In the protocol status management list shown in FIG. 5, it can be found that all of the communication protocols to be used in the communication network 100 are valid in the network MFP 1.

In the "#Security" column, a security level of the communication protocol which is not enabled secure communication is indicated. In the present embodiment, the communication protocols which are not enabled substantially secure communication are indicated by "1" in the "#Security" column. Thus, it can be found in the protocol characteristics list shown in FIG. 5 that the communication protocols "http", "snmp v1", "ipp", "1pr", "p9100", "ftp", and "p51001" are not capable of secure communication.

Similarly, a "#Management" column, a "#Print" column, and a "#Scan" column respectively indicate the functions of the network MFP 1 supported by the communication protocols which are not enabled secure communication. Meanings of the subitems "#Management", "#Print", and "#Scan" are the same to the information subitems "Management", "Print", and "Scan" provided in the protocol characteristics list.

The protocol status management list is generated upon a starting operation of the network MFP 1, such as activation and reset, according to the contents in the protocol characteristics list and a protocol control list, which will be described below. Further, when the protocol control list is updated, the protocol status management list is updated accordingly so that the content of the updated protocol control list is reflected in the protocol status management list.

The NVRAM 40 (FIG. 2) of the network MFP 1 is a nonvolatile rewritable memory to store data which can be rewritten. Information including the above-mentioned protocol control list, a client certificate, a client private key, a password, and a server certificate, which will be described later, is stored in the NVRAM 40.

Figure 6:
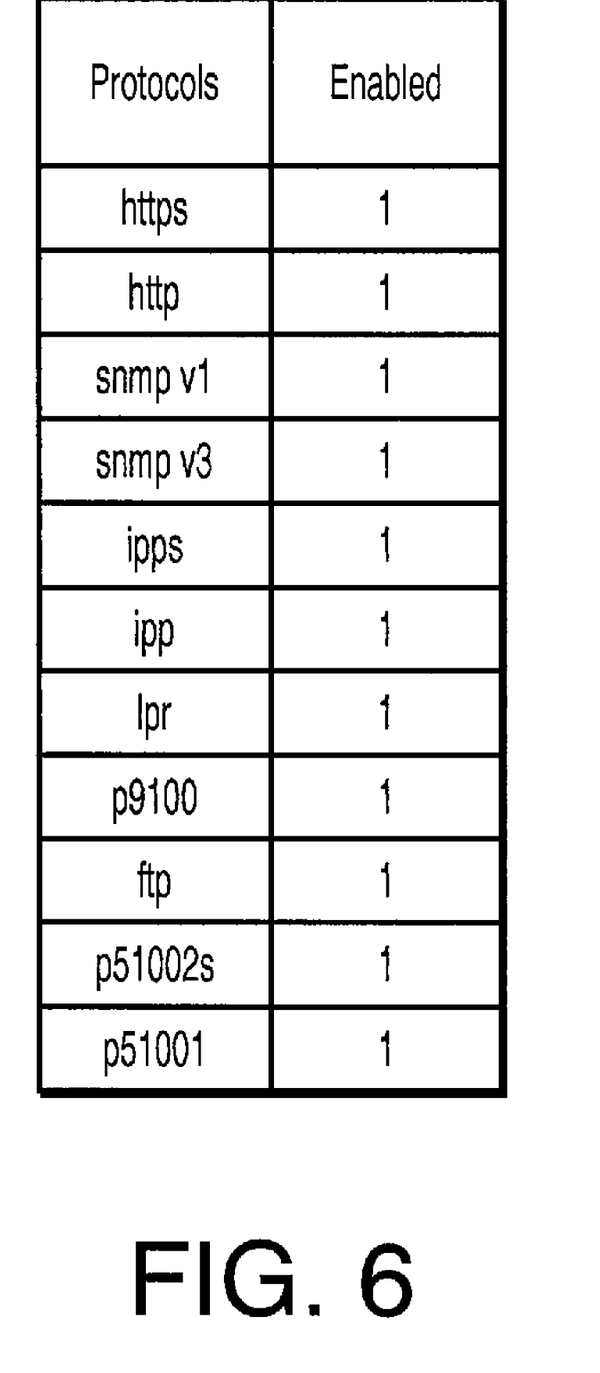
FIG. 6 is a chart to illustrate a protocol control list according to the first embodiment of the present invention.

FIG. 6 is a chart to illustrate the protocol control list according to the first embodiment of the present invention. The protocol control list indicates communication protocols which are valid in the network MFP 1. In the present embodiment, the protocol control list includes an information item "Enabled." The values in the "Enabled" column indicate validity of the communication protocols in the network MFP 1, i.e., a communication protocol valid in the network MFP 1 is indicated by "1" in the "Enabled" column. In the protocol control list shown in FIG. 6, it can be found that all the communication protocols to be used in the communication network 100 are valid in the network MFP 1.

The protocol control list is linked with the information item "Enabled" in the protocol status management list, and when the content in the "Enabled" column in the protocol control list is updated, the updated content will be reflected to the content in the protocol status management list.

For example, when the value "1" in the "Enabled" column for the communication protocol "http" in the protocol control list is changed to "0" (or "null",) the value "1" in the "Enabled" column for the communication protocol "http" in the protocol status management list is also changed to "0" (or "null.")

It is noted that the value "1" in each of the "#Secure" column, "#Management" column, "#Print" column, and "#Scan" column for the communication protocol "http" in the protocol control list is changed to "0" (or "null") according to the value in the "Enabled" column in the protocol control list being updated. The information items in the protocol control list is updated as necessary by a status updating unit 14 of the CPU 10, which will be described later.

The client certificate, the client private key, the password, and the server certificate stored in the NVRAM 40 are information to be used to establish secure communication between the network MFP 1 and one of the terminal devices 3. The information is used to generate a common key between the network MFP 1 and the terminal device 3.

The operation unit 50 (FIG. 2) of the network MFP 1 is a device to input an operation by a user to the network MFP 1. The operation unit 50 include, for example, an operation button (not shown) and an input interface such as an icon displayed in the display unit 60 (see FIG. 2.)

The display unit 60 displays information regarding the network MFP 1 such as configuration information of the printing function. In the present embodiment, the display unit 60 includes a LCD (liquid crystal display) panel 61 and an LED (light-emitting diode), which are modulated and turned ON/OFF respectively according to the information regarding the network MFP 1 to be displayed.

The image forming unit 70 (FIG. 2) serves to stabilize various information such as text and images onto a recording medium (e.g., paper) in black-and-white or in colors. That is, the image forming unit 70 has the printing function. The image forming unit 70 is used to form images according to print data based on instructions from the CPU 10.

The scanner unit 80 (FIG. 2) serves to optically read information written on paper as a recording medium and convert the information into image data. The image data read by the scanner unit 80 is stored in the RAM 30 and/or transmitted to the terminal device 3 upon request.

Hereinafter, the CPU 10 (FIGS. 2, 3) will be described in detail. The network MFP 1 in the present embodiment supports a plurality of communication protocols to process various information obtained through the network 2. The network MFP 1 is configured to disable unsecured communication protocols, through which communication security may not be ensured, at a point wherein secure communication through a secure communication protocol is validated so that security of the communication within the communication network 100 can be ensured.

In the present embodiment, the point wherein secure communication through a secure communication protocol is validated refers to, for example, a point wherein items to ensure the communication such as an electronic certificate and a public key are installed in the network MFP 1 and a point wherein a secure communication protocol such as "https" is enabled.

As shown in FIG. 3, the CPU 10 of the network MFP 1 according to the present embodiment is provided with a protocol setting system 11, by which validity and invalidity of each communication protocol is set. The protocol setting system includes a setting UI providing unit 18, a status detecting unit 12, an unsecured protocol detecting unit 13, and a status updating unit 14. Optionally, a status update notifying unit 15 may be included.

The setting UI providing unit 18 provides a user with a UI (user interface) through which the validity of the communication protocols. The setting UI providing unit 18 controls the network MFP 1 to display a setting screen in the display unit 60 according to a predetermined operation from the user. Further, the setting UI providing unit 18 transmits information representing the setting screen to the terminal device 3 so that the setting screen can be displayed in a display unit 62 (see FIG. 1) of the terminal device 3 when a predetermined location of the network MFP 1 specified by a predetermined URL (uniform resource locator) is accessed by the terminal device 3.

The status detecting unit 12 is configured to detect status (valid/invalid) of each communication protocol supported by the network MFP 1. The network MFP 1 refers to "Enabled" column in either the protocol status management list (see FIG. 4) or in the protocol control list (see FIG. 5), in which validity or invalidity of each communication protocol is described, in order to detect the status.

More specifically, the status detecting unit 12 outputs information representing the status of the communication protocol (hereinafter also referred to as "status information") to the unsecured protocol detecting unit 13 each time when the status of any of the communication protocols in the network MFP 1 is updated. Alternatively, solely status information of the communication protocol being updated can be output to the unsecured protocol detecting unit 13, and status information of the remaining communication protocols may not necessarily be output.

The unsecured protocol detecting unit 13 is configured to refer to the protocol status management list and/or the protocol characteristics list when one of the communication protocols (e.g., https) is validated (i.e., the status is updated) by an operation through the operation unit 50 of the network MFP 1 or by a remote operation from one of the terminal devices 3 and to detect less secure communication protocols than the validated communication protocol among the communication protocols supported by the network MFP 1.

More specifically, when the status information of the communication protocols is inputted from the status detecting unit 12, the unsecured protocol detecting unit 13 determines that one of the communication protocols (https) is newly validated. Thereafter, the unsecured protocol detecting unit 13 refers to the protocol status management list (or the protocol characteristics list) and judges as to whether the validated communication protocol (https) is a secure communication protocol. Further, if the updated communication protocols is a secure communication protocol, the unsecured protocol detecting unit 13 refers to the "#Group" column in the protocol status management list (see FIG. 5) and specifies functions of the network MFP 1 supported by the updated communication protocol (https.)

Thereafter, the unsecured protocol detecting unit 13 extracts communication protocols supporting the specified functions among the communication protocols included in the protocol status management list. Further, the unsecured protocol detecting unit 13 detects unsecured communication protocols among the extracted communication protocols. Thus, information indicating the unsecured communication protocols being detected (hereinafter referred to as unsecured protocol information) is generated and transmitted to the status updating unit 14 (see FIG. 3.)

If the updated communication protocol is not a secure communication protocol, the unsecured protocol detecting unit 13 terminates the detecting process.

Hereinafter, referring to the protocol status management list (FIG. 5), an example of a process executed by the unsecured protocol detecting unit 13 to detect the less secure communication protocols than the updated communication protocol will be described. In the following example, it is assumed that the communication protocol "snmp v3" is the newly updated communication protocol.

When the newly updated communication protocol is "snmp v3", the "Secure" column in the protocol status management list is referred to, and it is judged that "snmp v3" is a secure communication protocol by the value "1" in the "Secure" column. Further, it is found that "snmp v3" supports the "Management" function of the network MFP 1 from the protocol status management list. Accordingly, the other communication protocols supporting the "Management" function among the communication protocols included in the protocol status management list are extracted by the unsecured protocol detecting unit 13. Thus, the communication protocols "https", "http", "snmp v1", and "p9100" are extracted.

Further, communication protocols having the value "1" in corresponding "#Secure" column among the extracted communication protocols are detected by the unsecured protocol detecting unit 13. Thus, the communication protocols "http", "snmp v1", and "p9100" are found to be unsecured communication protocols. Thereafter, information indicating the unsecured communication protocols being found (hereinafter referred to as unsecured protocol information) is generated by the unsecured protocol detecting unit 13 and transmitted to the status updating unit 14.

The status updating unit 14 is configured to invalidate the communication protocols which are extracted by the unsecured protocol detecting unit 13 and detected to be unsecured by the status detecting unit 12. Further, the status updating unit 14 updates the "Enabled" column in either the protocol status management list or in the protocol control list which indicates validity/invalidity of the communication protocols.

More specifically, the status updating unit 14 disables communication in the communication protocols indicated in the unsecured protocol information and overwrites the protocol control list with the disabled status.

For example, if the communication protocols "http", "snmp v1", and "p9100" are indicated in the unsecured protocol information, the value "1" in each corresponding "Enabled" column in the protocol control list is changed to "0" (or "null.") Thus, the network MFP 1 is disabled to communicate with the terminal devices 3 in the communication protocols "http", "snmp v1", and "p9100" and enabled to communicate with the terminal devices 3 only in the secure communication protocols having the value "1" in each corresponding "Secure" column. Therefore, security of the communication between the network MFP 1 and the terminal deices 3 is ensured.

In addition to the above configuration, if the protocol setting system 11 includes the status update notifying unit 15, the status updating unit 14 can be configured to generate information indicating the invalidated communication protocols (hereinafter referred to as invalidated protocol information) and transmits the generated invalidated protocol information to the status update notifying unit 15.

The status update notifying unit 15 is configured to output information indicating the invalidated status of the unsecured communication protocols to the display unit 61 of the network MFP 1 following the status change in the communication protocols.

More specifically, when the invalidated protocol information is inputted from the status updating unit 14, the status update notifying unit 15 generates signals to instruct the display panel 61 of the network MFP 1 to output information indicating the invalidated communication protocols based on the invalidated protocol information. The display panel 61 displays a message indicating the unsecured communication protocols are invalidated according to the signals from the status update notifying unit 15 so that the user can recognize the communication protocols being invalidated.

If the setting of the communication protocols in the network MFP 1 is remotely operated through the network 2 from the terminal device 3, the status update notifying unit 15 generates information representing a screen to indicate the message similar to the message displayed in the display panel 61 as above on the display panel 62 of the terminal device 3. Thus, the invalidated communication protocols are indicated to be recognized by the user operating the terminal device 3.

Figure 7:
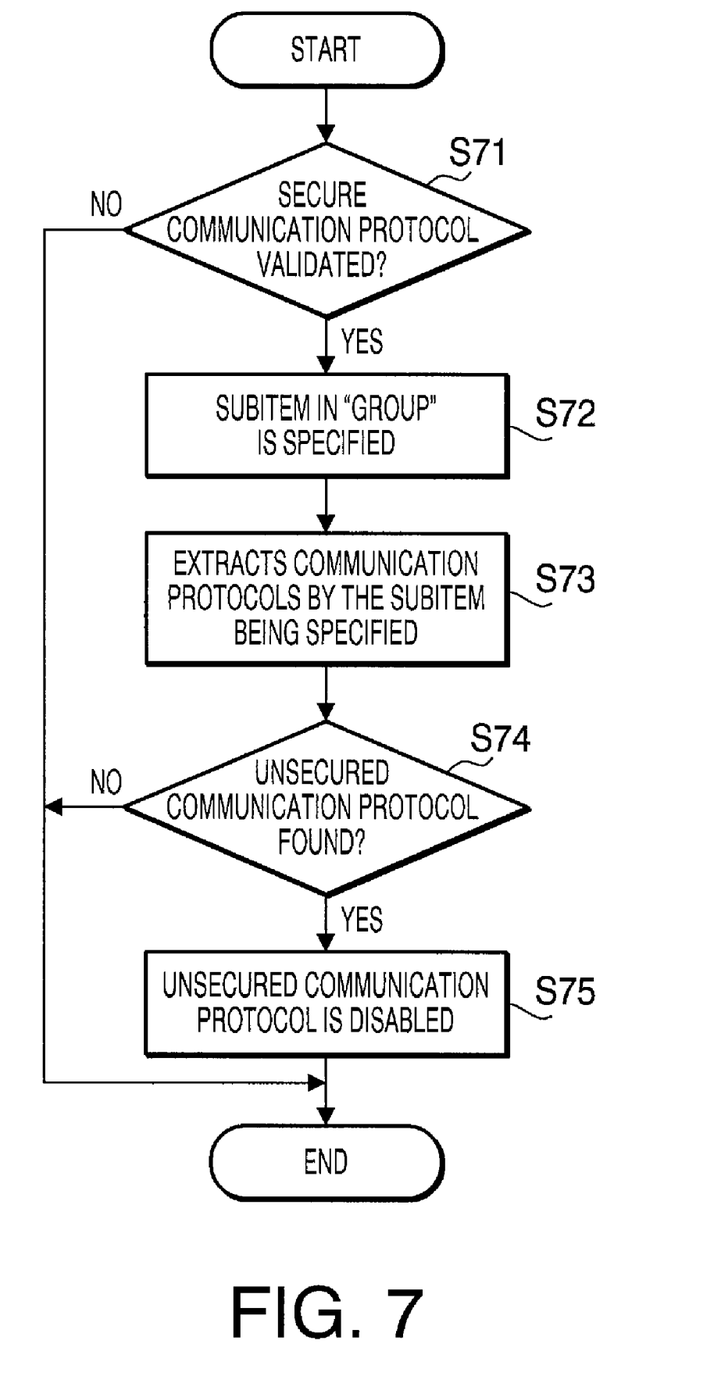
FIG. 7 is a flowchart to illustrate an information processing operation in the network MFP according to the first embodiment of the present invention.

Hereinafter, an information processing operation executed by the CPU 10 of the network MFP 1 configured as above will be described. FIG. 7 is a flowchart to illustrate the information processing operation in the network MFP 1 according to the first embodiment of the present invention.

In the information processing operation, when the status of a communication protocol is updated by the user through the operation unit 50 or the terminal device 3, in S71, it is judged by the status detecting unit 12 and the unsecured protocol detecting unit 13 as to whether the updated communication protocol is a secure communication protocol. In other words, it is judged as to whether a secure communication protocol is validated.

If the updated communication protocol is a secure communication protocol (S71: YES), in S72, the unsecured protocol detecting unit 13 refers to the protocol status management list and specifies functions of the network MFP 1 supported by the validated communication protocol. Thus, the subitem in "Group" of the validated communication protocol is specified.

Next, in S73, the unsecured protocol detecting unit 13 extracts communication protocols which support the function of the network MFP 1 specified in S72. Thus, the communication protocols to be invalidated are specified by the function.

Further, in S74, the unsecured protocol detecting unit 13 judges as to whether an unsecured communication protocol is found among the communication protocols extracted in S73. If an unsecured communication protocol is detected (S74: YES), in S75, the status updating unit 14 updates the "Enabled" column of the detected unsecured communication protocol in the protocol control list with "0" (or "null.") Thus, the detected unsecured communication protocol is disabled. Further, the status of the disabled communication protocol is stored in the "Enabled" column. In S74, if no unsecured communication protocol is detected (S74: NO), the operation is terminated.

With the above operation, when one of the communication protocols installed in the network MFP 1 is validated, unsecured communication protocols are invalidated so that secured communication can be achieved.

In addition to the above configuration, the CPU 10 of the network MFP 1 may include an examination activating system 19 (see FIG. 3). The examination activating system 19 is configured to provide the user with user interface, through which an examination of the security of the communication using the communication protocols is activated. In the examination, communication protocols with a security level being lower than the security of the validated communication protocol can be detected.

Figure 8:
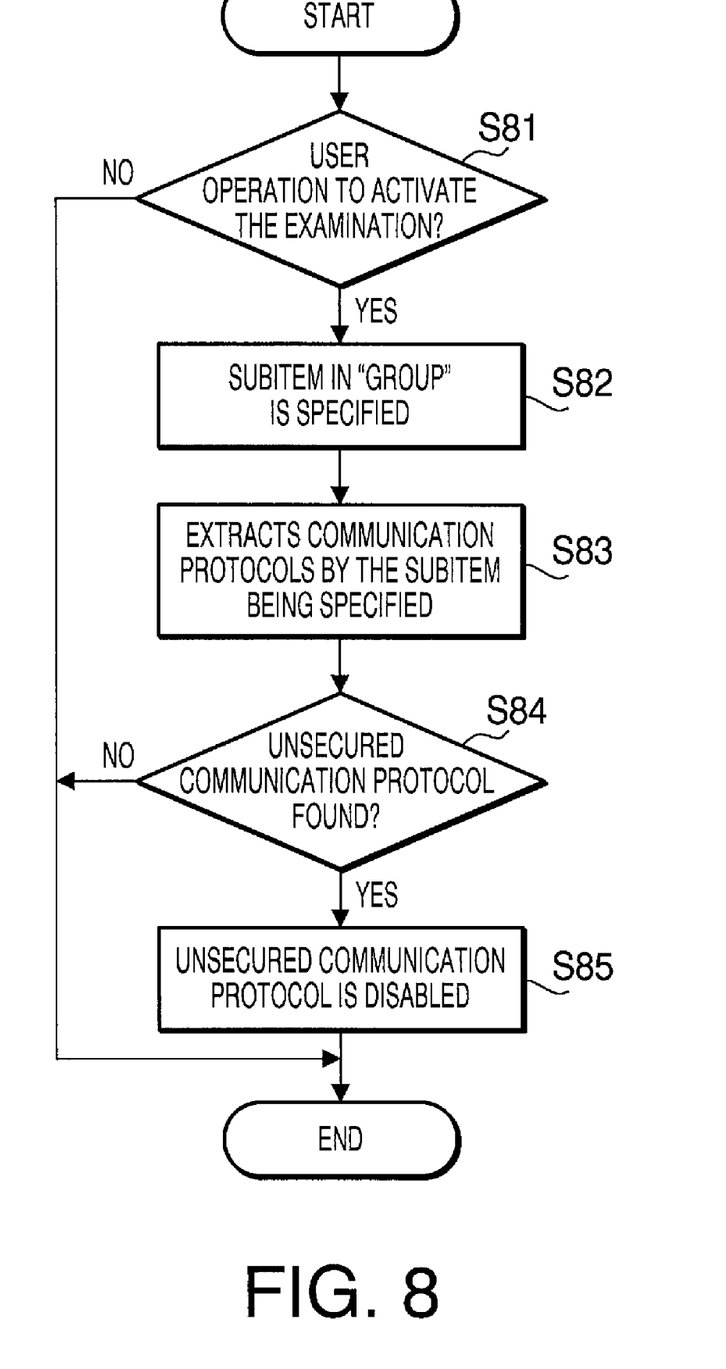
FIG. 8 is a flowchart to illustrate an information processing operation in the network MFP according to an additional configuration of the CPU according to the first embodiment of the present invention.

As the user interface is provided by the examination activating system 19, the user can operate the operation unit 50 of the network MFP 1 or the terminal device to access the network MFP 1. FIG. 8 is a flowchart to illustrate an information processing operation in the network MFP 1 according to the additional configuration of the CPU 1 according to the first embodiment of the present invention.

In S81, it is judged as to whether the user operates the operation unit 50 of the network MFP 1 or accesses remotely the network MFP 1 from the terminal device 2 through the user interface provided by the examination activating system 19 to examine a security level of the validated communication protocol. If it is judged that no user operation for the examination is given (S81: NO), the operation is terminated. If it is judged that the user operation is given to the operation unit 50 (S81: YES), in S82, the unsecured protocol detecting unit 13 refers to the protocol status management list and specifies functions of the network MFP 1 supported by the communication protocol being examined. Thus, the subitem in "Group" of the validated communication protocol is specified.

The remaining steps (S83-S85) are executed substantially identically to S73-S75 (see FIG. 7), therefore, description of those will be omitted. Thus, the user can activate the examination to determine the security level of the communication protocol in arbitrary timing, and secure communication using the secure communication protocol can be achieved.

Figure 9:
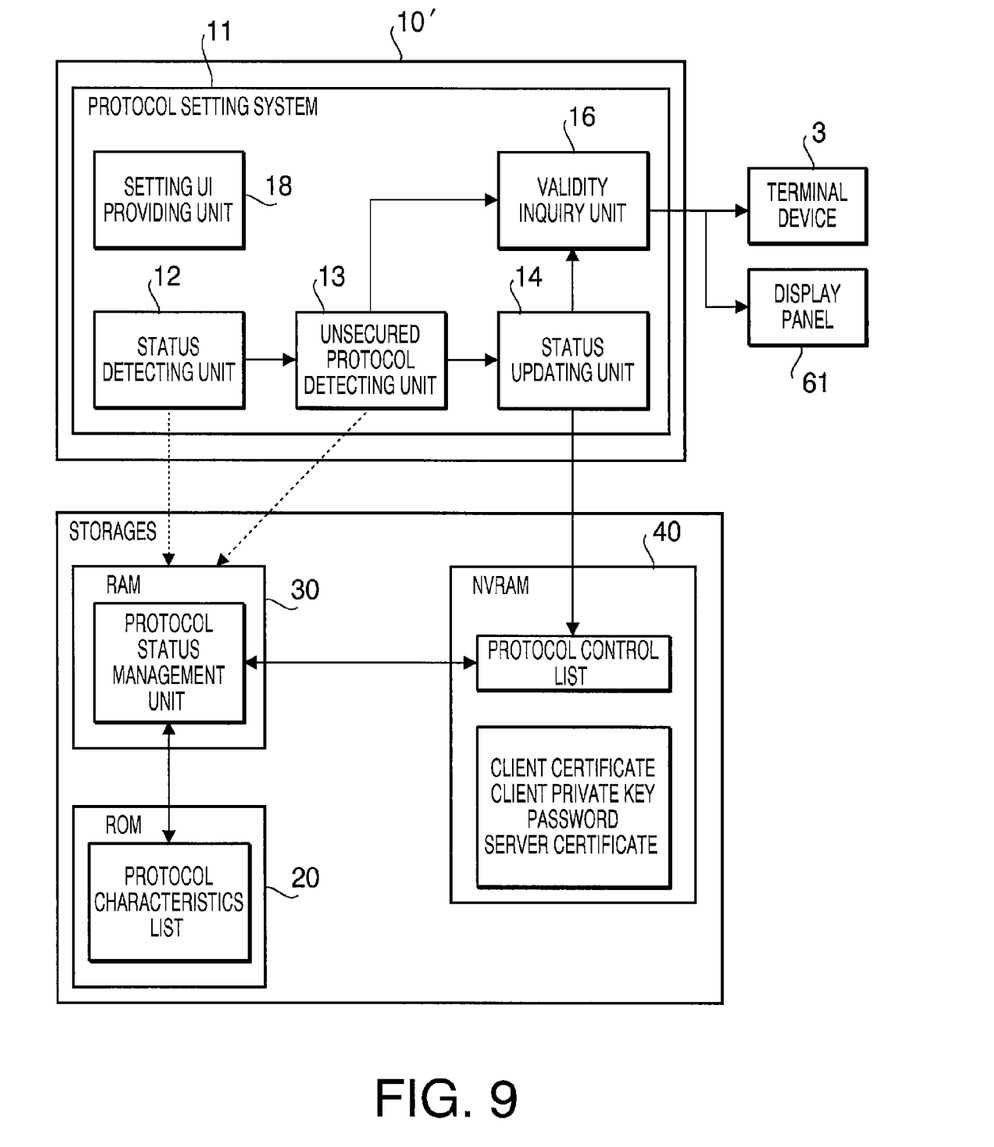
FIG. 9 is a block diagram illustrating configurations of a CPU, a ROM, a RAM, and an NVRAM according to a second embodiment of the present invention.

Hereinafter, a second embodiment of the CPU 10' of the network MFP 1 will be described. FIG. 9 is a block diagram illustrating configurations of the CPU 10', a ROM 20, a RAM 30, and an NVRAM 40 according to the second embodiment of the present invention. Components included in the CPU 10' having same configurations with the components included in the CPU 10 of the first embodiment are referred to by the identical reference numerals, and description of those will be omitted. As shown in FIG. 9, the CPU 10' includes a validity inquiry unit 16 in place of the protocol setting system 11 (see FIG. 3) in the CPU 10 of the previous embodiment.

The validity inquiry unit 16 is configured to output an inquiry in the display unit 60 of the network MFP 1 to be viewed by the user. With this configuration, the user is inquired as to whether the communication protocols, which are extracted by the unsecured protocol detecting unit 13 to be unsecured and detected by the status detecting unit 12, should be invalidated. Therefore, with the above configuration, the unsecured protocol detecting unit 13 generates the unsecured protocol information and outputs the same to the validity inquiry unit 16.

As the validity inquiry unit 16 receives the unsecured protocol information, the validity inquiry unit 16 displays a message to inquire the user for as to whether the unsecured communication protocol should be invalidated on the display panel 61 of the display unit 60. The user inputs an operation to the operation unit 50 to make judgment accordingly. It is noted that the inquiry message is displayed in the display unit 62 of the terminal device when the user is operating the network MFP 1 remotely from the terminal device 3.

Figure 11:
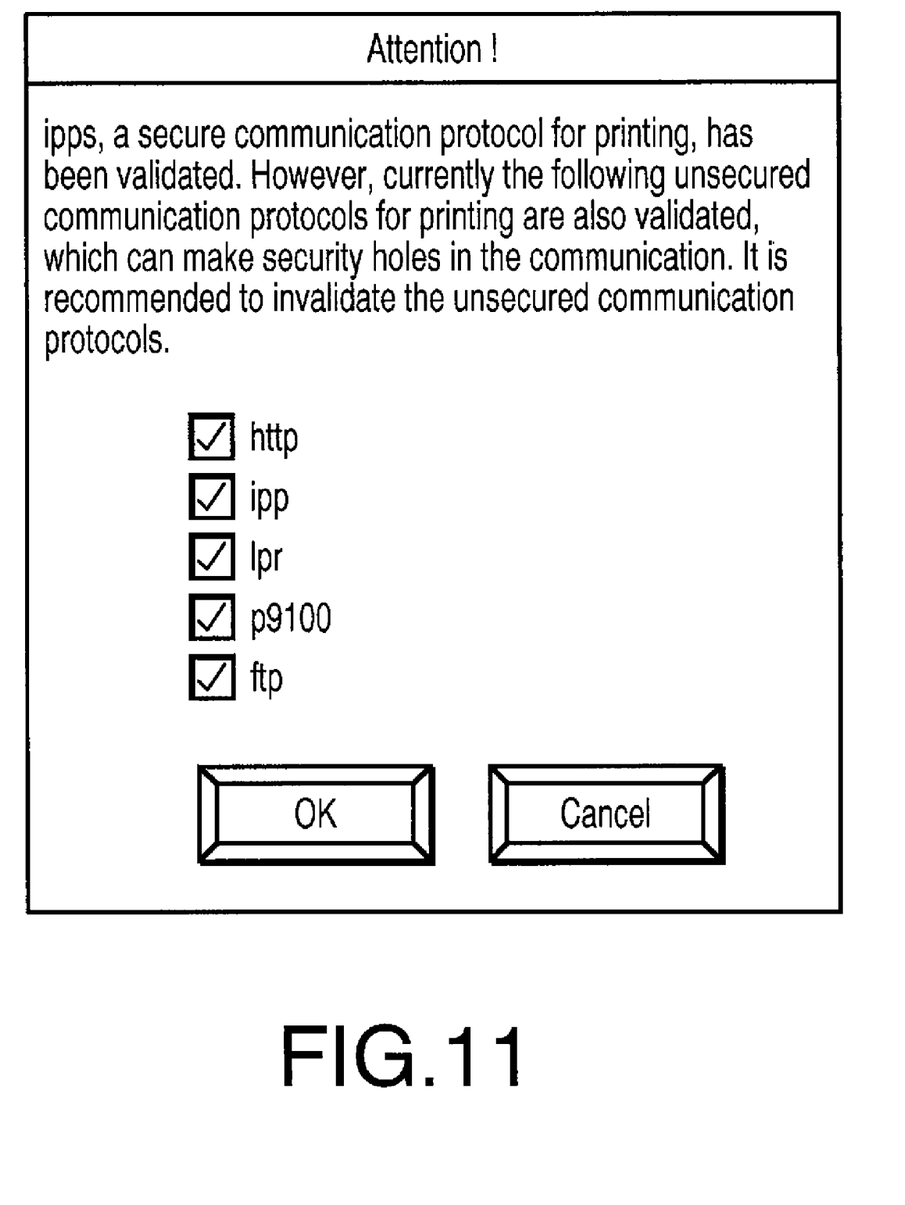
FIG. 11 is a diagram to illustrate an inquiry screen to be displayed on a display unit of a terminal device according to the second embodiment of the present invention.

For example, if the communication protocols "1pr", "p9100", "ftp", and "http" are specified to be unsecured by the unsecured protocol information, an inquiry screen as shown in FIG. 11 is displayed in the display unit 62 of the terminal device 3. FIG. 11 is a diagram to illustrate the inquiry screen to be displayed on the display unit 62 of the terminal device 3 according to the second embodiment of the present invention.

As the user views the inquiry screen and inputs an operation to invalidate the unsecured communication protocols through the operation unit 50 or the terminal device 3, information indicating the specified unsecured communication protocols (invalidated protocol information) are inputted in the validity inquiry unit 16.

Thereafter, the validity inquiry unit 16 generates signals to invalidate the communication protocols specified by the invalid protocol information and outputs the generated signals to the status updating unit 14. Accordingly, the status updating unit 14 invalidates the communication protocols specified by the invalidated protocol information.

Figure 10:
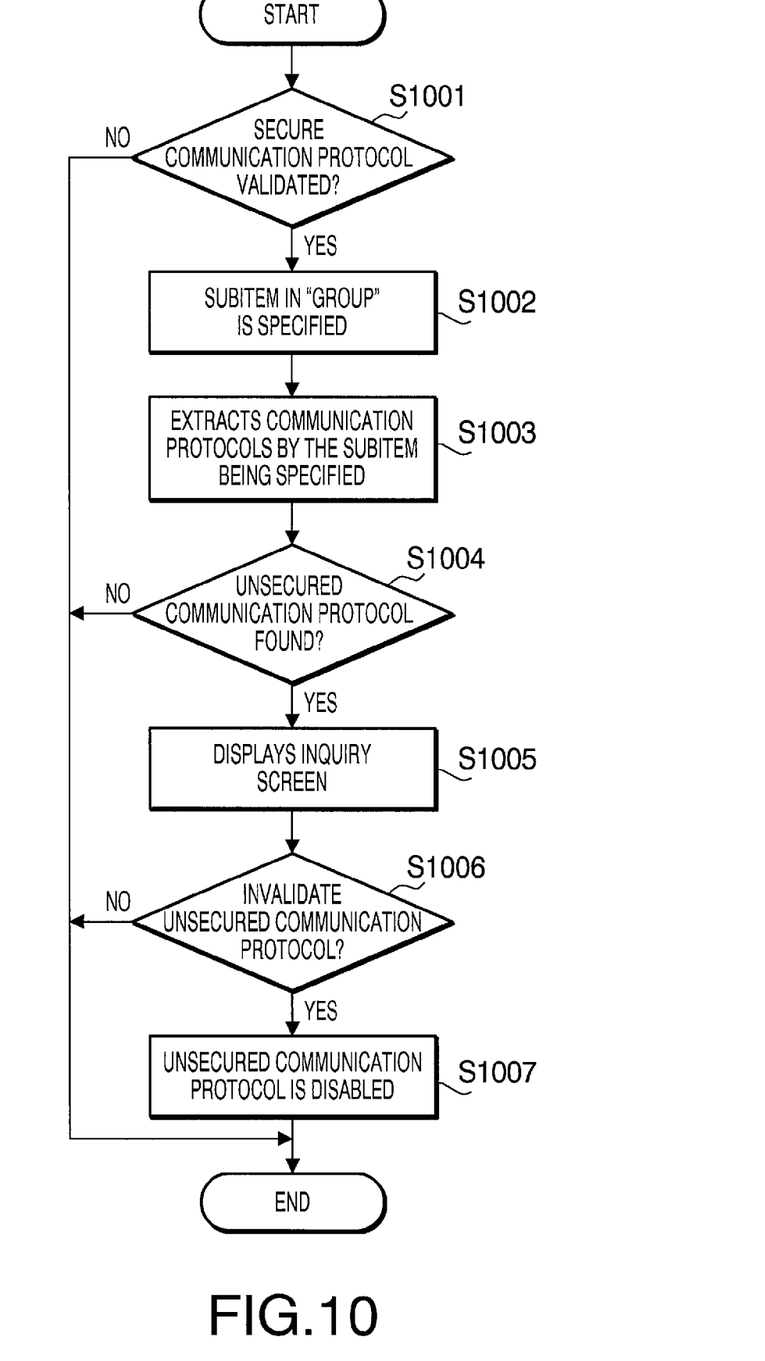
FIG. 10 is a flowchart to illustrate an information processing operation in the network MFP according to the second embodiment of the present invention.

Hereinafter, an information processing operation executed by the CPU 10' of the network MFP 1 configured as above will be described. FIG. 10 is a flowchart to illustrate the information processing operation in the network MFP 1 according to the second embodiment of the present invention. However, in the information processing operation according to the second embodiment, steps S1001-S1004 are executed similarly to the steps S71-S74 in the information processing operation according to the first embodiment. Therefore, description of those steps is omitted.

In S1004, if an unsecured communication protocol is detected (S1004: YES), in S1005, the validity inquiry unit 16 outputs an inquiry screen with a message to inquire the user for as to whether the communication protocols detected to be unsecured in S1004 should be invalidated on the display panel 61 of the display unit 60 in the network MFP 1 or in the display unit 62 of the terminal device 3 (see FIG. 11.) Thus, the user is allowed to select as to whether the unsecured communication protocol should be invalidated.

In S1006, it is judged as to whether the user has selected any of the unsecured communication protocol to be disabled. If it is judged that the user has not selected to invalidate the unsecured communication protocol (S1006: NO), the operation is terminated. If it is judged that the user has selected (S1006: YES), according to the user's selection, information indicating the selected unsecured communication protocols (invalidated protocol information) is transmitted to the validity inquiry unit 16. The validity inquiry unit 16 receiving the invalidated protocol information generates signals to require the status updating unit 14 to invalidate the communication protocols specified by the invalid protocol information and outputs the generated signals to the status updating unit 14. Accordingly, in S1007, the status updating unit 14 invalidates the communication protocols specified by the invalidated protocol information and updates the status of the invalidated communication protocol in the protocol control list.

In S1004, if no unsecured communication protocol is detected (S1004: NO), the operation is terminated.

Although examples of carrying out the invention have been described, those skilled in the art will appreciate that there are numerous variations and permutations of the information processing apparatus that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiments, the status detecting unit 12 and the unsecured protocol detecting unit 13 refer to the protocol status management list stored in the RAM 30 in order to make judgment as to whether the currently validated communication protocol is a secured protocol (S71, S1001) and to detect the unsecured communication protocol. However, the protocol characteristics list in the ROM 20 and the protocol control list in the NVRAM 40 may be referred to for the judgment and the detection.

Further, in the above embodiments, the validity and the invalidity of the communication protocols are defined in the protocol control list. However, the validity and the invalidity may be defined in the protocol status management list, which is linked to the protocol control list.

Moreover, the unsecured protocol detecting unit 13 may refer to the protocol status management list in order to detect all of the unsecured communication protocol being installed in the network MFP 1. In other words, the "#Secure" column in the protocol status management list can be referred to in order to detect the unsecured communication protocols.

Furthermore, contents of the protocol characteristics list, the protocol status management list, and the protocol control list may be modified as necessary, for example, when a new communication protocol is introduced in the communication network 100.

It is noted that the present invention is not limited to the information processing apparatus as described above, but may be achieved in a computer program or a batch of programs to be executed in a computer to carry out the above described functions. In these configurations, the program and the batch of programs can be stored in a storage device such as the RAM 30 and read by the CPU 10 according to a predetermined instruction. The above-described program and the batch of programs can be stored in a computer readable storage medium to be provided to users.

What is claimed is:

1. An information processing apparatus, which is configured to communicate in a plurality of communication protocols with another device being installed in a network, comprising:
   a storage device;
   a Security list, in which a security level of each of the communication protocols is listed, stored in the storage device;
   a status management list, in which at least one of validity and invalidity of each of the communication protocols is described, being stored in the storage device; and
   a protocol setting system, which sets at least one of validity and invalidity of each of the communication protocols,
   wherein at least one of validity and invalidity of each of the communication protocols can be arbitrarily set by a user;
   wherein the protocol setting system includes:
   a status detecting unit, which refers to the status management list and detects at least one of validity and invalidity of each of the communication protocols;
   an unsecured protocol detecting unit, which refers to the security list when at least one of the communication protocols is validated and detects a communication protocol with a security level being lower than the validated communication protocol; and
   a status updating unit, which invalidates the communication protocol detected by the unsecured protocol detecting unit to have the lower security level and detected to be valid by the status detecting unit.

2. The information processing apparatus according to claim 1,
   wherein the unsecured protocol detecting unit refers to the security list when the user validates one of the communication protocols by a user operation and detects a communication protocol with a security level being lower than the validated communication protocol.

3. The information processing apparatus according to claim 2,
   wherein the status updating unit updates the status management list to describe the invalidity of the invalidated communication protocol.

4. The information processing apparatus according to claim 3, further comprising a status update notifying unit to output invalidated protocol information, which indicates the invalidation of the communication protocol with the lower security level, to a display device to be displayed.

5. The information processing apparatus according to claim 2, further comprising:
   a validity inquiry unit, which outputs information to prompt the user to select as to whether the communication protocol with the lower security level detected by the unsecured protocol detecting unit and detected to be valid by the status detecting unit should be invalidated to a display device to be displayed,
   wherein the status updating unit invalidates the communication protocol selected by the user to be invalidated.

6. The information processing apparatus according to claim 5,
   wherein the status updating unit updates the status management list to describe the invalidity of the invalidated communication protocol.

7. The information processing apparatus according to claim 2,
   wherein the security list describes a characteristic of each of the communication protocols;

wherein the communication protocols are classified into groups by the characteristic described in the security list; and wherein the unsecured protocol detecting unit refers to the security list when the user validate one of the communication protocols by the user operation and detects the communication protocol with the security level being lower than the validated communication protocol among one of the groups of communication protocols.

8. The information processing apparatus according to claim 1, further comprising:

an examination activating system, which activates an examination to inspect the security level of each of the communication protocols;

wherein the unsecured protocol detecting unit refers to the security list when the examination activating system activates the examination, detects a communication protocol with a security level being lower than the validated communication protocol, and invalidates the detected communication protocol; and wherein the status updating unit updates the status management list to describe the invalidity of the invalidated communication protocol.

9. A non-transitory computer usable storage medium comprising computer readable instructions that cause a computer to function as a protocol setting function, the computer having a storage device and communicating using a plurality of communication protocols with another device in a network, the protocol setting function setting at least one of validity and invalidity of each of the communication protocols by executing:

a status detecting step for detecting at least one of validity and invalidity of each of the communication protocols by referring to a status management list stored in the storage device, the status management list indicating at least one of validity and invalidity of each of the communication protocols, wherein, when a first communication protocol of the communication protocols is validated by a user, the protocol setting function further executing:

an unsecured protocol detecting step for detecting a communication protocol having a lower security level than a first security level of the first communication protocol by referring to a security list stored in the storage device, the security list indicating a security level of each of the communication protocols;

an invalidating step for invalidating each of the communication protocols detected at the status detecting step as the communication protocol having been validated and detected at the unsecured protocol detecting step as the communication protocol having the lower security level than the first security level of the first communication protocol; and a status updating step for updating the status management list.

* * * * *